(12) United States Patent
Böckenhoff et al.

(10) Patent No.: US 11,837,921 B2
(45) Date of Patent: Dec. 5, 2023

(54) ELECTRIC MACHINE AND MOTOR VEHICLE

(71) Applicant: AUDI AG, Ingolstadt (DE)

(72) Inventors: Paul Böckenhoff, Ingolstadt (DE); Tom Schneider, Dresden (DE); Paul Wetzel, Dresden (DE)

(73) Assignee: Audi AG, Ingolstadt (DE)

( * ) Notice: Subject to any disclaimer, the term of this patent is extended or adjusted under 35 U.S.C. 154(b) by 29 days.

(21) Appl. No.: 17/234,215

(22) Filed: Apr. 19, 2021

(65) Prior Publication Data
US 2021/0328471 A1 Oct. 21, 2021

(30) Foreign Application Priority Data

Apr. 20, 2020 (DE) .......................... 102020110664.5

(51) Int. Cl.
*H02K 1/30* (2006.01)
*H02K 3/487* (2006.01)
*H02K 3/38* (2006.01)

(52) U.S. Cl.
CPC ..................................... *H02K 1/30* (2013.01)

(58) Field of Classification Search
CPC .................................. H02K 3/487; H02K 3/38
USPC ............................................. 310/214, 40 R
See application file for complete search history.

(56) References Cited

U.S. PATENT DOCUMENTS

| | | | | |
|---|---|---|---|---|
| 5,886,446 | A | * | 3/1999 | Katagiri .................... H02K 1/24 29/598 |
| 6,113,024 | A | * | 9/2000 | Pittard .................... H02K 3/527 242/433 |
| 6,933,648 | B2 | | 8/2005 | Buchan et al. |
| 7,821,171 | B2 | | 10/2010 | Lemmers, Jr. et al. |
| 9,991,755 | B2 | | 6/2018 | Jang et al. |
| 2010/0133946 | A1 | * | 6/2010 | Lemmers, Jr. ......... H02K 3/527 310/214 |
| 2015/0076935 | A1 | * | 3/2015 | Bulatow ................ H02K 3/487 310/214 |
| 2016/0072352 | A1 | | 3/2016 | Lee et al. |
| 2016/0099621 | A1 | * | 4/2016 | Himmelmann ........ H02K 16/02 310/216.131 |

(Continued)

FOREIGN PATENT DOCUMENTS

| | | |
|---|---|---|
| DE | 10 2004 062 162 A1 | 7/2006 |
| DE | 102017222615 A1 | 6/2019 |

(Continued)

*Primary Examiner* — Jose A Gonzalez Quinones
(74) *Attorney, Agent, or Firm* — SEED INTELLECTUAL PROPERTY LAW GROUP LLP

(57) ABSTRACT

An electric machine comprises a rotor with a rotor body, wherein the rotor body has a plurality of poles each carrying at least one rotor winding formed from a plurality of conductor loops, wherein the poles extend in a radial direction of the rotor and the conductor loops running through grooves respectively formed between two adjacent poles, wherein a support element extending in the radial direction is respectively arranged in the grooves between the rotor windings of the adjacent poles, which support element, at a radially outer end of the groove, bears up against a thrust-bearing element arranged in a radially positionally-fixed manner between the adjacent poles, wherein the support element presses the conductor loops against the rotor body during a rotation and/or a temperature increase of the rotor.

15 Claims, 2 Drawing Sheets

(56) References Cited

U.S. PATENT DOCUMENTS

2017/0353092 A1\* 12/2017 Park .......................... H02K 1/24
2018/0109170 A1\* 4/2018 Park ........................ H02K 3/487
2020/0177046 A1\* 6/2020 Finger-Albert ........ H02K 3/527

FOREIGN PATENT DOCUMENTS

| EP | 2807726 B1 | 9/2019 | | |
|---|---|---|---|---|
| FR | 3068538 A1 | 1/2019 | | |
| WO | 2014/024023 A2 | 2/2014 | | |
| WO | WO-2014024016 A2 | \* | 2/2014 | ............. H02K 1/246 |

\* cited by examiner

ELECTRIC MACHINE AND MOTOR VEHICLE

BACKGROUND

Technical Field

Embodiments of the invention relate to an electric machine comprising a rotor with a rotor body, wherein the rotor body has a plurality of poles each carrying at least one rotor winding formed from a plurality of conductor loops, wherein the poles extend in a radial direction of the rotor and the conductor loops running through grooves respectively formed between two adjacent poles. Embodiments of the invention furthermore relate to a motor vehicle.

Description of the Related Art

In electric machines with an externally excited rotor, for example, in externally excited synchronous machines, the rotor field of the electric machine is generated with the aid of rotor windings arranged on the rotor of the electric machine and through which a current flows. Since the rotor rotates during operation of the electric machine, the rotor windings must be mechanically fixed against a centrifugal force occurring during operation of the electric machine. Such a fastening of the rotor windings can be achieved, for example, by a complete casting of the rotor windings with their receptacles on the rotor, so that the casting can serve as a supporting body for the rotor windings. In doing so, residual stresses can however arise as a result of the hardening of the casting, which can lead to adhesion failure during operation of the electrical machine, for example, delamination of the casting compound from the rotor, and/or to a cohesion failure, which is to say the formation of cracks in the casting compound. Since such defects usually occur asymmetrically, this can result in rotor imbalance, which can have undesirable consequences such as damage to a bearing or noise emission during operation of the electric machine.

Another known possibility for fastening rotor windings to the rotor is the use of support plates, which, for example, are applied to the windings between two adjacent poles and fixed to the rotor. The use of support plates can have the disadvantage that they can expand radially under the influence of centrifugal force, so that the windings become detached from the stator in some areas. This can result in an undesirable air gap between the windings and the stator, which can have a detrimental effect on heat dissipation from the rotor windings. A reduction in the cooling of the rotor windings can have a particularly negative effect on the long-term performance of the rotor or alternatively the electrical machine.

US 2017/0 353 092 A1 describes a synchronous machine with rotor coils in which wedge elements are inserted between the rotor coils to secure the rotor coils against centrifugal forces during rotation of the rotor. Furthermore, the wedge elements provide electrical insulation between the individual coils.

WO 2014/024 023 A2 shows a rotor for an electric machine, wherein T-shaped retaining elements are arranged inside the rotor winding to fix the rotor coils during operation of an electric machine that comprises the rotor.

DE 10 2004 062 162 A1 describes an electric machine with a salient pole rotor which has a displacement body. In order to improve the cooling of the electric machine, the displacement bodies are arranged and designed in such a way that they form, at least in sections, cooling planes with the excitation windings around their circumference. This allows a radial air flow to be established along an upstream pole edge, which exits again as a radial air flow at the other, downstream pole edge, with a circular flow around the displacement body.

BRIEF SUMMARY

Embodiments of the invention are based on the task of providing an electrical machine which enables the conductor loops of the rotor windings to be fixed as stably as possible.

In some embodiments, an electric machine of the type described above is provided with a radially extending support element arranged in the grooves between the rotor windings of the adjacent poles, which support element rests at a radially outer end of the groove against a thrust-bearing element arranged in a radially fixed position between the adjacent poles, the support element pressing the conductor loops against the rotor body during rotation and/or temperature increase of the rotor.

The rotor body comprises a plurality of poles, with one respective groove being formed between two adjacent poles, in which groove are arranged the conductor loops of the rotor windings respectively arranged at the adjacent poles. Between the rotor windings of two adjacent poles, which is to say between the conductor loops of the rotor windings arranged on adjacent poles, a support element is arranged in a groove, which extends through the groove in a radial direction. At a radially outer end of the groove, the support element rests against a thrust-bearing element which is positionally-fixed at least radially between the adjacent poles. As a result of the fact that the support element rests against the thrust-bearing element, it can be supported radially against the thrust-bearing element during rotation of the rotor, so that no or essentially no expansion of the support element in the radial direction is possible. This makes it possible for the support element to expand in the circumferential direction, at least in some areas, during a rotation occurring during operation of the electrical machine and/or during a temperature increase occurring during operation of the electrical machine, thus pressing the conductor loops against the rotor body. For this purpose, it can, in particular, be provided that along its radial extension, the support element is always at least partially located in the circumferential direction, in direct or indirect contact with the conductor loops of the rotor windings, so that an occurring expansion of the support element generates a pressure acting on the conductor loops of the rotor windings. The side surfaces of the support element extending in the radial direction can have a shape corresponding to the shape of the side surfaces of the rotor windings, which also extend in the radial direction and are each directed towards the center of the groove or towards the support element, in order to form the largest possible contact surface for exerting the pressure.

The conductor loops can be pressed against the rotor body by the support element. In particular, the conductor loops can each be pressed against the pole carrying them or alternatively against further conductor loops of the same rotor winding, so that overall the conductor loops arranged between the adjacent poles and the support element are each pressed against the rotor body or alternatively one of the adjacent poles of the rotor body. Depending on the shape of the winding and/or the support element, it is also possible for the conductor loops to be pressed at least partially against a radially inner end of the groove, which is to say, in the direction of an axis of rotation of the rotor. The support element can therefore press the conductor loops of the rotor windings arranged at adjacent poles into the groove, which is to say, against the walls of the groove formed by the poles and against a section of the rotor body forming the radially inner bottom of the groove. The support element can also be referred to as a displacement body.

The radial support on the positionally-fixed thrust-bearing element, which is designed as non-deformable or essentially non-deformable, in particular under operating conditions of the rotor, enables a deformation of the support element, occurring due to a rotation of the rotor and/or a temperature increase of the rotor, to cause an at least area-wide expansion of the support element in the circumferential direction. Supporting the support element in the radially outer end of the groove on the thrust-bearing element prevents the support element from deforming in the radial direction out of the groove due to the rotation or alternatively temperature increase, so that the combination of the thrust-bearing element and the support element can achieve an improved fixing of the conductor loops in the groove.

This has the advantage that a functionality of the electric motor can be maintained even at extreme loads, for example at very high speeds and/or very high temperatures. Since correct positioning of the conductor loops in the grooves of the rotor is achieved even when exposed to large centrifugal forces generated at high rotational speeds, it can be avoided that air gaps occur between the conductor loops or alternatively the rotor windings and the rotor body. This has the advantage that the heat conduction path between the rotor windings and the rotor body is uninterrupted, even under the influence of centrifugal forces. Moreover, a thermally induced expansion of the support body can also exert pressure directed against the rotor body on the conductor loops.

This allows the electric machine to also be used for high-rev drives, for example to drive a motor vehicle. In such machines, for example, speeds of up to 17,000 rpm can occur and temperatures of up to 180° C. can be attained, wherein, in particular, the support element and its bearing on the thrust-bearing element always ensure that the conductor loops are firmly fixed and thereby that the conductor loops or alternatively the rotor windings are seated on the rotor with as little play as possible.

When compared with a complete casting of the rotor windings in the grooves, this offers the advantage that the cost of a casting material, for example, an epoxy resin, can be dispensed with and that no cost- and time-intensive casting process, such as vacuum-based casting or pressure gelation, must be used. The devices and process steps used for this purpose, in particular the time-intensive curing of the casting material, can be dispensed with. In contrast to complete casting of the windings in the grooves, the use of the support element and the thrust-bearing element means that delamination of the rotor windings formed, for example, by the respective cast conductor tracks are permissible, since a stable fixing of the rotor windings in the grooves is still possible. Allowing delaminations in the cast rotor windings can reduce residual stresses that can occur during curing in cast rotor windings.

It is possible that several thrust-bearing elements and/or several support elements are arranged one behind the other in the axial direction of the rotor body. A support element can be supported on several thrust-bearing elements and/or several support elements can be supported on one thrust-bearing element.

It can be provided that the support element consists at least partially of a thermoplastic material. A thermoplastic material can be selected, for example, which does not plasticize at temperatures that arise during operation, for example at temperatures of up to 200° C. or more. This ensures that the material used to form the support element, in particular a polymer, is sufficiently soft under all operating conditions that it can deform due to centrifugal force and thus contribute to the fixing of the conductor loops by providing radial support on the thrust-bearing element. In some embodiments, it may be provided that the support element is at least partially made of polyamide. It is possible that, for example, the support element is formed of polyamide and embedded glass fibers.

It may be provided that the thrust-bearing element is fastened to two adjacent poles, wherein a section of the thrust-bearing element extending between the poles and spanning the groove bears, in particular fully, on the support element. The thrust-bearing element is thereby at least fixed against radial movements and movements in the circumferential direction, so that it does not move during rotation of the rotor of the electric machine, but instead remains positionally-fixed. The use of the largest possible contact surface of the support element on the thrust-bearing element, which is to say, in particular, full bearing of the support element on the section of the thrust-bearing element spanning the groove, enables the thermally and/or centrifugally induced expansion of the support element in the circumferential direction, in particular at the radially outer end of the support element, which is to say, at the end of the support element in contact with the thrust-bearing element.

In some embodiments, it may be provided that the opposing poles each have a fastening groove, wherein the thrust-bearing element is fastened to the poles by a respective edge engagement in the fastening grooves. The thrust-bearing element can, for example, be plate-shaped so that two opposing edges of the plate can engage in the circumferentially spaced fastening grooves formed on opposite poles. This enables the thrust-bearing element to be fixed both in the radial direction and in the circumferential direction. The layout of the fastening grooves at the poles can be used, for example, to insert the thrust-bearing element in the axial direction between the opposite poles during assembly of the electrical machine. It is also possible to fasten the thrust-bearing element in the axial direction.

The thrust-bearing element can be a sliding cover. A thrust-bearing element designed as a sliding cover serves to close a radially outer end of the groove, in particular over the entire axial length of the groove.

The thrust-bearing element can be at least partly made of metal, in particular an austenitic steel, or of ceramic. The thrust-bearing element can, for example, be a stamped sheet metal part. The forming of the thrust-bearing element out of metal, in particular from an austenitic steel, or from ceramic has the advantage that a high mechanical strength of the thrust-bearing element can be achieved, so that no or essentially no deformations of the thrust-bearing element occur in the axial direction during a rotation of the rotor.

In some embodiments, it may be provided that a width of a cross-sectional profile of the thrust-bearing element increases at least sectionally in a radially outward direction. By a widening of the cross-sectional profile of the support element, in particular towards the radially outward end, it can be ensured that during the widening, in addition to the laterally acting force component, there is also an at least partially radially inwardly directed force component which acts on the conductor loops. In doing so, it can be achieved that the winding is also pressed at least partially in the radial direction into the groove and/or against the pole carrying the rotor winding. In particular, the cross-sectional profile of the support element can be designed to correspond to the contours of the rotor windings directed towards the center of the groove, so that the support element can bear against the two adjacent rotor windings in the radial direction over as large an area as possible, in particular over the entire radial extent. In particular, the support element can, at least in sections, be widened outwardly. It is possible, for example, that the transverse section of the support element is Y-shaped, wherein the broader, widening end bears against the thrust-bearing element. The lower, thinner section of the cross-section may thereby abut the rotor body with its lower end, in particular at a bottom of the groove.

It can be provided that the support element and the thrust-bearing element engage in one another via a positive connection comprising at least one tongue-and-groove connection. In doing so, it can be provided that the thrust-bearing element and/or the support element has at least one fastening groove, wherein the respective other part has a corresponding tongue which engages in the fastening groove. This enables a positive fastening of the support element to the thrust-bearing element, in particular in the circumferential direction.

In some embodiments, it may be provided that a groove insulation, in particular an insulating paper and/or an insulating coating, is arranged on an inner wall of the grooves and/or on the support element. This groove insulation contributes, for example, to insulate the rotor windings from the grounding potential of the rotor body. It is possible that a groove insulation is also provided between the support element and the rotor windings, in which case, in particular, the support element, the groove insulation, and the rotor windings are in direct contact with each other.

It can be provided that the rotor body is formed from a sheet metal pack comprising a plurality of metal sheets, and the supporting element has at least one through hole extending in the axial direction, wherein a tie rod is arranged in the at least one through hole for fastening the metal sheets to one another. In particular, the metal sheets forming the rotor body can be lined up axially. By providing at least one axial through hole, a tie rod can be accommodated in the support element, which can be used for fastening or alternatively tensioning the metal sheets of the rotor body in the axial direction. In doing so, it can, in particular, be provided that the tie rod completely fills out the through hole formed in the support element in order to avoid deformation of the support element into the cavity of the through hole.

For a motor vehicle, it is provided that it comprises an electric machine as described herein. In particular, the electric machine may be a traction electric motor of the motor vehicle, which may be used to drive the motor vehicle. The electric machine may, in particular, be a high-rev drive, which can attain speeds of up to 17,000 rpm. It is possible for the motor vehicle to comprise a plurality of these electric machines, for example, as traction electric motors associated with individual axles and/or individual wheels.

BRIEF DESCRIPTION OF THE SEVERAL VIEWS OF THE DRAWINGS

Further advantages and details will be apparent from the embodiments described below and from the drawings.

DETAILED DESCRIPTION

Figure 1:
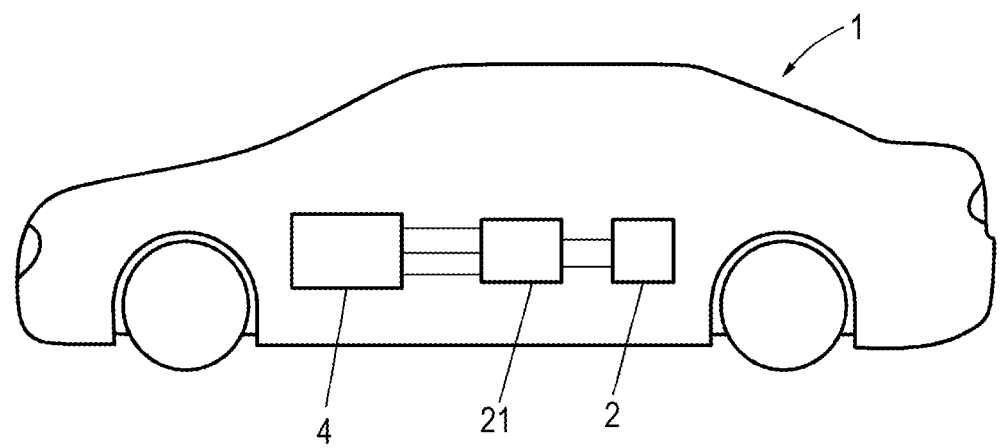
FIG. 1 shows a side view of a motor vehicle.

In FIG. 1, a side view of a motor vehicle 1 is shown. The motor vehicle 1 comprises an electric machine 2, which is designed as a traction electric motor of the motor vehicle 1. The motor vehicle 1 can be driven by the electric machine 2 in an electric driving mode. For the supply of electrical energy, the electrical machine 2 is connected to a traction energy storage device 4, for example, a traction battery, of the motor vehicle 1 via power electronics 21. It is possible for the motor vehicle to have more than one electric machine 2 in the form of a traction electric motor, with the multiple electric machines 2 each being assigned to an axle and/or a wheel of the motor vehicle 1.

Figure 2:
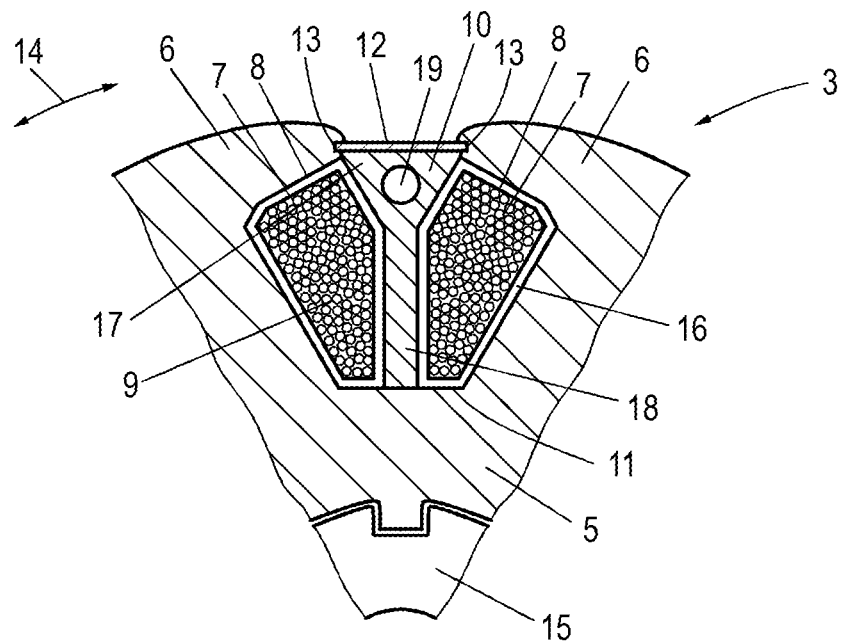
FIG. 2 shows a side view of a first embodiment of a machine.

FIG. 2 shows a side view of a rotor 3 of an electric machine 2. For the sake of clarity, only a circular segment-shaped section of the rotor is shown. The entire rotor 3 is circular in shape and comprises several, for example eight, identically formed and adjoining circular segments corresponding to the section shown.

The rotor 3 comprises a rotor body 5, which has a plurality of poles 6. Each of the poles 6 carries a rotor winding 8 formed by a plurality of conductor loops 7. The conductor loops 7 each extend through a groove 9, which is each formed between two adjacent poles 6. A support element 10 is arranged between the conductor loops 7 of two adjacent rotor windings 8 inside the groove. This support element 10 extends from a bottom 11 of the groove 9, which is formed by the rotor body 5, to a thrust-bearing element 12 arranged in a positionally-fixed position at a radially outer end of the groove 9.

The thrust-bearing element 12 is here plate-shaped, wherein two opposing edges of the thrust-bearing element 12 extend in the axial direction of the rotor, each engaging positively in a fastening groove 13 formed at the poles 6. As a result of the positive engagement in the fastening grooves 13, the thrust-bearing element 12 is arranged radially and in the circumferential direction in a positionally-fixed position on the rotor body 5 or alternatively on the respective opposite poles 6. The support element 10 bears against the section of the thrust-bearing element 12 spanning the groove 9.

In order to achieve a high rigidity of the thrust-bearing element 12 in the radial direction of the rotor, it can, in particular, be made entirely or partly of austenitic steel. This has the effect that, when the rotor rotates in the circumferential direction about a rotor axis 15 shown by the arrow 14, there is no or essentially no deformation of the thrust-bearing element 12, even due to the centrifugal forces occurring at high speeds.

The support element 10 consists at least partially of a thermoplastic material, for example, made of polyamide or of polyamide and glass fibers, and is designed in such a way that it presses the conductor loops 7 of the rotor windings 8 against the rotor body 5 during rotation and/or temperature increase of the rotor 3. For this purpose, the support element is designed to be sufficiently soft at the temperatures that arise during operation. The support element 10 has a cross-sectional shape which corresponds to the shape of the rotor windings 8 respectively directed towards the center of the groove 9, so that the support element 10 can bear as directly as possible against the rotor windings 8. In doing so, the supporting element 10 can either bear directly against the rotor windings 8, which comprise, for example, a plurality of conductor loops 7 which are cast together. It is also possible that a groove insulation 16, that is, for example, provided between the rotor windings 8 and the poles 6 or alternatively the rotor body 5 also extends between the support element 10 and the rotor windings 8. The groove insulation 16 may, for example, be made of an insulating paper or be formed by a spray coating.

When the rotor 3 rotates during operation of the electric machine 2, centrifugal forces act on the rotor 3 or on its individual components. These centrifugal forces cause a deformation of the support element 10, which presses the rotor windings 8 or alternatively the conductor loops 7 of the rotor windings 8 against the rotor body 5 due to the radial support of the support element 10 on the thrust-bearing element 12.

The support element 10 comprises a Y-shaped cross-section, with a section 17 which widens in a radially outward direction and rests at its radially outer end against the thrust-bearing element 12, and a straight section 18 which engages positively in a corresponding, narrowing geometry of the two adjacent windings 8. The widened cross-section of the support element 10 in section 17 ensures that a widening of the support element 10 achieved by centrifugal force and/or temperature increase, particularly in the region of section 17, presses the rotor windings 8 or alternatively their conductor loops 7 against the respective poles 6 carrying them or alternatively against the bottom 11 of the groove 9. This is because this interlocking geometry results in a radially inward component on the windings 8 when the support element 10 is expanded, which presses them into the groove 9. In this way, a fixation of the rotor windings 8 in the rotor 3 is achieved, even at high speeds and/or at high temperatures, which may occur during operation of the electrical machine 2 comprising the rotor 3. Pressing the conductor loops 7 or alternatively the rotor windings 8 into the groove 9 or alternatively against the respective rotor winding supporting poles 6 and/or the bottom 11 of the groove ensures that no air gaps are formed between the rotor windings 8 and the rotor body 5. This allows a heat flow from the rotor windings 8 to the rotor body 5 to flow as unhindered as possible, which simplifies cooling of the rotor windings 8 during operation of the electrical machine 2 comprising the rotor 3.

Expansion of the support element 10 due to temperature increase of the rotor 3 occurring during operation of the electrical machine 2 also ensures corresponding lateral and radial pressure, which presses the rotor windings 8 or alternatively their conductor loops 7 into the groove 9. A deformation of the support element 10 in a radial direction out of the groove is avoided due to the support of the support element 10 on the thrust-bearing element 12.

It is possible that the support element 10 has a through hole 19 which extends through the support element 10 in the axial direction, which is to say, in FIG. 2, in the direction of the image plane. In this through hole 19, a tie rod (not shown here) can be arranged, with which axially aligned metal sheets, which form the rotor body 5, can be fastened to each other.

The thrust-bearing element 12 is designed as a sliding cover which closes the groove 9 at the outer end in the radial direction, in particular over the entire axial length of the rotor 3. It is also possible that instead of a single thrust-bearing element 12, several thrust-bearing elements 12 are used, in particular, directly adjoining each other in the axial direction. It is also possible to provide several axially aligned support elements. The thrust-bearing element 12 can, for example, be manufactured as a stamped sheet metal part made of a metal, in particular from a steel or an austenitic steel. However, it is also possible to make the thrust-bearing element 12 from another sufficiently rigid and strong material, for example from ceramic.

Figure 3:
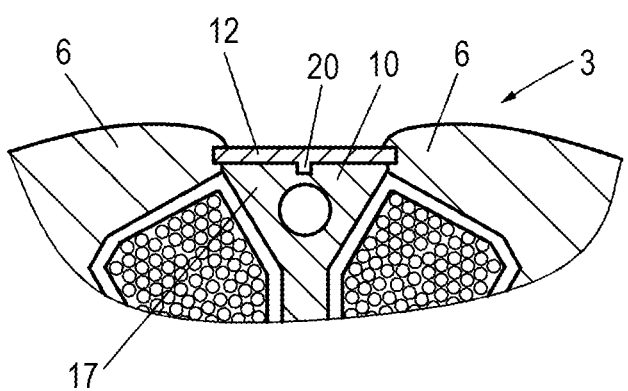
FIG. 3 shows a side view of a second embodiment of an electric machine.

FIG. 3 shows a schematic side view of a second embodiment example of a rotor 3 of an electric machine 2. A difference to the first embodiment consists in the support element 10 and the thrust-bearing element 12, which are attached to each other via a tongue-and-groove connection 20. In doing so, the support element 10 has a groove at its radially outer end of the section 17, in which a corresponding tongue engages, which is formed on the radially inner side of the thrust-bearing element 12. It is also possible that more than one tongue-and-groove connection 20 is provided, or that circumferentially extending tongue-and-groove connections are also formed between the support element 10 and the thrust-bearing element 12. Furthermore, it is also possible that the thrust-bearing element 12 respectively has one or more grooves and that the support element 10 has corresponding tongues for positive connection to the grooves of the thrust-bearing element 12.

German patent application no. 10 2020 110664.5, filed Apr. 20, 2020, to which this application claims priority, is hereby incorporated herein by reference, in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
a rotor including a rotor body, wherein the rotor body has a plurality of poles each carrying at least one rotor winding formed from a plurality of conductor loops, wherein the poles extend radially with respect to the rotor and the conductor loops extend through grooves between adjacent poles; and
a plurality of support elements extending radially with respect to the rotor, wherein each support element is arranged in a respective one of the grooves and between respective rotor windings of adjacent poles, wherein each support element, at a radially outer end of the groove, bears up against a respective thrust-bearing element arranged in a radially positionally-fixed manner between adjacent poles, wherein each support element presses respective conductor loops against the rotor body, as a result of circumferential expansion of the support element, during a rotation and/or a temperature increase of the rotor.

2. The electric machine according to claim 1, wherein the support elements comprise a thermoplastic material.

3. The electric machine according to claim 2, wherein the support elements comprise polyamide.

4. The electric machine according to claim 1, wherein each thrust-bearing element is attached at two adjacent poles, wherein a section of each thrust-bearing element extends between the two adjacent poles, and wherein a section of each thrust-bearing element bears against a respective support element.

5. The electric machine according to claim 1, wherein each of the poles has a fastening groove, and wherein each thrust-bearing element is fastened to respective poles by edge engagement in the fastening grooves.

6. The electric machine according to claim 1, wherein each thrust-bearing element is a sliding cover.

7. The electric machine according to claim 1, wherein each thrust-bearing element comprises metal or ceramic.

8. The electric machine according to claim 1 wherein each thrust-bearing element comprises an austenitic steel.

9. The electric machine according to claim 1, wherein each support element bears against the rotor body at a radially inner end of a groove.

10. The electric machine according to claim 1, wherein a width of a cross-sectional profile of the support element increases outwardly at least in sections in the radial direction.

11. The electric machine according to claim 1, wherein each support element engages a respective thrust-bearing element via a positive connection comprising at least one tongue-and-groove connection.

12. The electric machine according to claim 1, wherein a groove insulation is arranged on inner walls of the grooves.

13. The electric machine according to claim 12 wherein the groove insulation comprises an insulating paper and/or an insulating coating.

14. The electric machine according to claim 1, wherein the rotor body is formed from a sheet metal pack comprising a plurality of metal sheets, and the supporting element has at least one through hole extending in an axial direction, wherein a tie rod is arranged in the at least one through hole for fastening the metal sheets to one another.

15. A motor vehicle comprising an electric machine including:
  a rotor including a rotor body, wherein the rotor body has a plurality of poles each carrying at least one rotor winding formed from a plurality of conductor loops, wherein the poles extend radially with respect to the rotor and the conductor loops extend through grooves between adjacent poles; and
  a plurality of support elements extending radially with respect to the rotor, wherein each support element is arranged in a respective one of the grooves and between respective rotor windings of adjacent poles, wherein each support element, at a radially outer end of the groove, bears up against a respective thrust-bearing element arranged in a radially positionally-fixed manner between adjacent poles, wherein each support element presses respective conductor loops against the rotor body, as a result of circumferential expansion of the support element, during a rotation and/or a temperature increase of the rotor.

\* \* \* \* \*